United States Patent [19]

Taghezout

[11] Patent Number: 5,739,647
[45] Date of Patent: Apr. 14, 1998

[54] MULTI-ROTOR ELECTROMECHANICAL TRANSDUCER AND METHOD FOR CONTROLLING SUCH A TRANSDUCER

[75] Inventor: Daho Taghezout, Morges, Switzerland

[73] Assignee: Eta SA Fabriques d'Ebauches, Grenchen, Switzerland

[21] Appl. No.: 769,368

[22] Filed: Dec. 19, 1996

[30] Foreign Application Priority Data

Dec. 28, 1995 [FR] France ................................. 95 15637

[51] Int. Cl.$^6$ ................................................. H02K 16/00
[52] U.S. Cl. ........................... 318/34; 310/112; 310/114
[58] Field of Search ........................... 318/685, 696, 318/34, 112, 113; 310/112, 114, 152, 156

[56] References Cited

U.S. PATENT DOCUMENTS

| | | | |
|---|---|---|---|
| 3,863,084 | 1/1975 | Hasebe | 310/126 |
| 4,477,759 | 10/1984 | Guerin et al. | 318/696 |
| 4,528,483 | 7/1985 | Muller | 318/112 |
| 4,563,604 | 1/1986 | Xuan | 310/49 R |

FOREIGN PATENT DOCUMENTS

| | | |
|---|---|---|
| 0 217 164 | 4/1987 | European Pat. Off. . |
| 0 698 957 | 2/1996 | European Pat. Off. . |

OTHER PUBLICATIONS

Patent Abstracts of Japan vol. 009, No. 258 (E–350), 16 Oct. 1985 & JP-A-60 106355 (Seiko Denshi Kogyo KK), 11 Jun. 1985.

*Primary Examiner*—Bentsu Ro
*Attorney, Agent, or Firm*—Griffin, Butler, Whisenhunt & Kurtossy

[57] ABSTRACT

In order that each of its rotors (18 to 21) may be individually controlled, the transducer (1) comprises a stator (2) having two main parts (3, 4) and 2N+1 transverse parts (5 to 13). N openings (14 to 17) through each of which a stator (18 to 21) passes, are each arranged in one of the main parts in the prolongation of one of the even rank transverse parts. N+1 coils each surround one of the odd rank transverse parts.

Application to selective driving of several mobile elements.

8 Claims, 7 Drawing Sheets

MULTI-ROTOR ELECTROMECHANICAL TRANSDUCER AND METHOD FOR CONTROLLING SUCH A TRANSDUCER

The present invention concerns an electromechanical transducer comprising a single stator and several rotors able to be used, for example, for driving the various indicators of a timepiece, such as the indicators of the current time, the date, the day of the week, a measured period of time, a alarm time etc.

An object of the present invention is to propose a transducer of this type wherein the various rotors can be controlled independently of each other so that they rotate selectively in one or other of their two directions of rotation while having a compact and relatively inexpensive structure.

This object is achieved by the features of the transducer forming the subject of claim 1.

In particular, two stator poles, partially surrounding any one of the openings provided for the rotors, are directly connected to the first ends of two transverse parts forming cores surrounded respectively by two coils and a third stator pole also partially surrounding such opening is directly connected to a transverse part which does not carry a coil and which is connected to the second ends of the two transverse parts carrying coils.

Another object of the present invention is to propose a method allowing such a transducer to be controlled in such a way that its various rotors rotate independently of each other, selectively in one or other of their two directions of rotation.

This object is achieved by the steps of the claimed control method which is explained in detail in the description of the present invention.

Other objects, features and advantages of the present invention will be made clear by the description of some of its embodiments which will be made hereinafter. These embodiments, which will only be described by way of non-limiting example, are shown schematically in the annexed drawing, in which.

Figure 1:
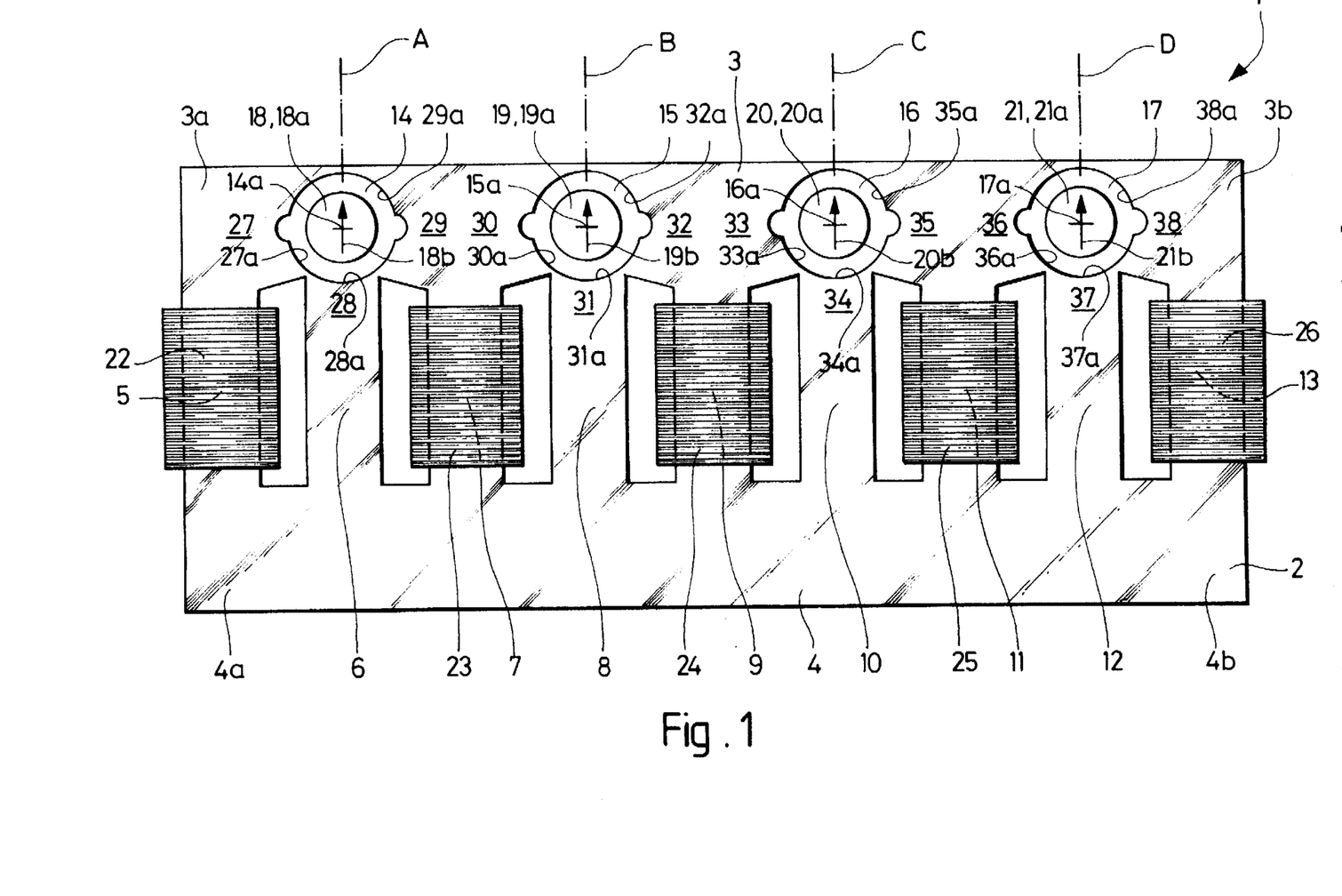
FIG. 1 shows a first embodiment of the transducer according to the invention.

In the embodiment shown in FIG. 1, the electromechanical transducer of the present invention, which is designated by the general reference 1, comprises a stator, four rotors and five coils.

The stator, which is designated by the reference 2, comprises two main parts 3 and 4 each having a first end 3a, 4a, and a second end 3b, 4b.

By analogy, the end of stator 2 where first ends 3a and 4a of main parts 3 and 4 are situated will be called the first end of said stator, and the end where second ends 3a and 4a of such main parts 3 and 4 are situated will be called the second end of stator 2.

Stator 2 further comprises nine transverse parts 5 to 13 which are adjacent to each other and each comprise a first and a second end which are respectively connected to first main part 3 and to second main part 4. First ends 3a and 4a, and second ends 3b and 4b of such main parts 3 and 4 are respectively connected via transverse parts 5 and 13.

It is important to note that parts 3 and 4, on the one hand, and parts 5 to 13 on the other hand, are only respectively termed main and transverse parts in order to distinguish them from each other and in order to simplify the present description. As will be made clear by the description which follows, each of these parts, however it is termed, is just as important and indispensable to the makeup and the operation of transducer 1 as any of the other parts.

Again in order to simplify the present description, a rank will be assigned to each of transverse parts 5 to 13, beginning in an arbitrary manner with transverse part 5 which is the closest to the first end of stator 2 and following the order in which these transverse parts are arranged in such stator 2. Rank 1 is thus assigned to transverse part 5, rank two to transverse part 6, and so on to transverse part 13 which is the closest to the second end of stator 2 and to which rank 9 is assigned. One will thus be able to distinguish between the odd rank transverse parts, i.e. those which are designated by the references 5, 7, 9, 11 and 13, and the even rank transverse parts, i.e. those which are designated by the references 6, 8, 10 and 12.

It should be noted that this distribution into odd rank transverse parts and even rank transverse parts remains unchanged if rank one is assigned to transverse part 13 and rank nine to transverse part 5, since there is an odd number of transverse parts 5 to 13.

In the present example, stator 2 is pierced with four openings 14 to 17 which are all arranged in main part 3, each in the prolongation of one of even rank transverse parts 6, 8, 10 and 12. Openings 14 to 17 have the general shape of circular cylinders having respectively central axes 14a, 15a, 16a and 17a.

Transducer 1 also comprises four rotors 18 to 21 which each pass through one of openings 14 to 17. Each of such rotors 18 to 21 is free to move in rotation about an axis which is identical to that of opening 14 to 17 through which it passes and which will be designated by the same reference as the latter.

Rotors 18 to 21 will not be described in detail since they may be entirely similar to well known stepping motor rotors which are in particular used in electronic timepieces for driving, for example, the time display hands. It will simply be mentioned that each of such rotors 18 to 21 comprises a permanent bipolar magnet with radial magnetisation which is situated in the opening 14 to 17 through which such rotors pass. These permanent magnets are shown alone in FIG. 1 where they are respectively designated by the references 18a to 21a. The axes of magnetisation of magnets 18a to 21a, which are perpendicular to respective axes of rotation 14a to 17a, are respectively designated by the references 18b to 21b and are symbolised by arrows in full lines.

Transducer 1 also comprises five coils 22 to 26 which each surround one of odd rank transverse parts 5, 7, 9, 11 and 13 of stator 2 and which are connected, via connections which are not shown, to an electronic control circuit of transducer 1, also not shown, the operation of which will be described hereinafter.

The man skilled in the art will easily understand that even rank transverse parts 6, 8, 10 and 12 preferably are integral with main parts 3 and 4, and that such piece is made of a material with high magnetic permeability such as one of those which are frequently used for manufacturing the stator of conventional stepping motors.

The man skilled in the art will also easily understand that odd rank transverse parts 5, 7, 9, 11 and 13, which constitute respectively the cores of coils 22 to 26, are preferably pieces added onto the rest of stator 2 and coupled magnetically to main parts 3 and 4 by fixing means, such as screws or rivets, which are not shown.

For a reason which will be made clear hereinafter, the two portions of main part 3 and the portion of one of transverse parts 6, 8, 10 and 12 which surround each of openings 14 to 17 will be called stator poles, and the ends of such stator poles forming part of the internal wall of such openings 14 to 17 will be called polar expansions. The stator poles surrounding openings 14 to 17 will be respectively designated by the references 27 to 29, 30 to 32, 33 to 35 and 36 to 38, stator poles 28, 31, 34 and 37 being respectively portions of transverse parts 6, 8, 10 and 12, and the other stator poles all being portions of main part 3. The polar expansions formed by the ends of stator poles 27 to 38 will be respectively designated by the references 27a to 38a.

Again for the sole purpose of simplifying the present description, the stator poles which are portions of main part 3 and the polar expansions which end them will be termed main stator poles and polar expansions. Likewise, the stator poles which are portions of the even rank transverse parts and the polar expansions which end them will be termed transverse stator poles and polar expansions.

The dimensions of main part 3 and of even rank transverse parts 6, 8, 10 and 12, and the relative arrangement of these various parts and of openings 14 to 17 are selected in such a way that the three stator poles which surround each of such openings are separated in pairs by zones of sufficiently small section that their magnetic resistance is much higher than that of the other parts of stator 2 so as to insulate magnetically said three stator poles. Such high magnetic resistance zones are frequently called necks.

Moreover, these dimensions and this arrangement are selected in such a way that the two main polar expansions which partially surround each opening 14 to 17 are symmetrical to each other with respect to a plane containing axis 14a to 17a of this opening and passing through the middle of the transverse polar expansion which also partially surrounds this same opening, and so that such transverse polar expansion is itself symmetrical with respect to the same plane. The four planes of symmetry of openings 14 to 17 are respectively designated by the references A to D, and their traces in the plane of FIG. 1 are represented by dot and dash lines.

It is seen that each main stator pole is directly coupled to a first end of one of the transverse parts which form the cores of coils 22 to 26, i.e. the uneven rank transverse parts in the example of FIG. 1.

Moreover, all the transverse stator poles are directly connected to a first end of one of the transverse parts which does not carry a coil, i.e. the even rank transverse parts in the example of FIG. 1.

Transducer 1 also comprises means for positioning rotors 18 to 21, which are arranged so that each of such rotors has two rest positions, or minimum energy positions, and that these two positions are those wherein axes of magnetisation 18b to 21b of magnets 18a to 21a are respectively situated in planes of symmetry A, B, C or D defined hereinbefore.

In other words, the positioning means of each of rotors 18 to 21 are arranged so that, in the two rest positions of such rotor, the direction of the axis of magnetisation of its magnet passes through the middle of the polar expansion situated at the end of the single stator pole which is not directly connected to the core of a coil from among the three stator poles surrounding the opening in which such rotor is arranged.

In the present example, the positioning means of each rotor 18 to 21 are formed by two notches each arranged in one of the main polar expansions which partially surrounds such rotor, these two notches also being symmetrical to each other with respect to respective plane of symmetry A, B, C or D.

In FIG. 1, magnets 18a to 21a of rotors 18 to 21 have all been shown in that of the two rest positions of such rotors wherein their axis of magnetisation 18b to 21b is oriented towards the neck diametrically opposite to respective transverse polar expansion 28a, 31a, 34a or 37a. This rest position of rotors 18 to 21 will be arbitrarily called the first rest position. The other rest position of rotors 18 to 21, i.e. that wherein axles of magnetisation 18b to 21b of their magnet 18a to 21a is oriented towards the middle of respective transverse polar expansion 28a, 31a, 34a or 37a, will then obviously be called the second rest position.

The operation of transducer 1 will now be described with the aid of FIGS. 2 to 4. The electronic control circuit, which is not shown, of transducer 1 is arranged so as to connect coils 22 to 26, or only certain of the latter, to an electric energy source, which is also not shown, for a limited period of time, as will be described in detail hereinafter. In other words, the control circuit of transducer 1 is arranged so as to apply pulses, which will be called in a general manner control pulses, to coils 22 to 26.

As will be explained in more detail hereinafter, certain of these control pulses are intended to cause rotation of one or other of rotors 18 to 21 and they will be called driving pulses. Likewise, certain others of these pulses are intended to compensate, if necessary, an undesired effect of the driving pulses and will be called compensation pulses.

Moreover, in order to avoid useless repetition, it will be admitted that the electric energy supplied to one or other of coils 22 to 26 during a driving pulse or a compensation pulse is sufficient for the desired effect to be obtained.

The current which passes in a coil in response to a control pulse applied to the latter induces a magnetic field in the transverse part of stator 2 which constitutes the core of such coil, the direction of such magnetic field obviously depending upon the direction of such current and thus upon the polarity of such control pulse. In the description which follows, a control pulse whose polarity is such that, when it is applied to a coil, the magnetic field induced in the core of the latter has a direction going from the end of such core which is connected to main part 4 towards the other end of the core, i.e. the end which is connected to main part 3, will be arbitrarily termed a positive control pulse. A control pulse in response to which the magnetic field has the opposite direction to that which has just been described will be termed a negative control pulse.

In order to simplify the description which follows, it will be admitted that the control circuit of transducer 1 is also arranged in such a way that the currents which pass through coils 22 to 26 in response to the control pulses which are applied thereto are practically constant for the entire duration of such pulses. The man skilled in the art will see however that this is not a condition for the proper operation of transducer 1 and that the control circuit of the latter may well also be arranged, for example, in such a way that the voltages applied to coils 22 to 26 are constant for the entire duration of the control pulses. Furthermore, the man skilled in the art knows various transducer supply means, in particular of the homological type, which have various advantages, for example minimum consumption, and which may also be implemented for controlling a transducer according to the present invention.

Figure 2:
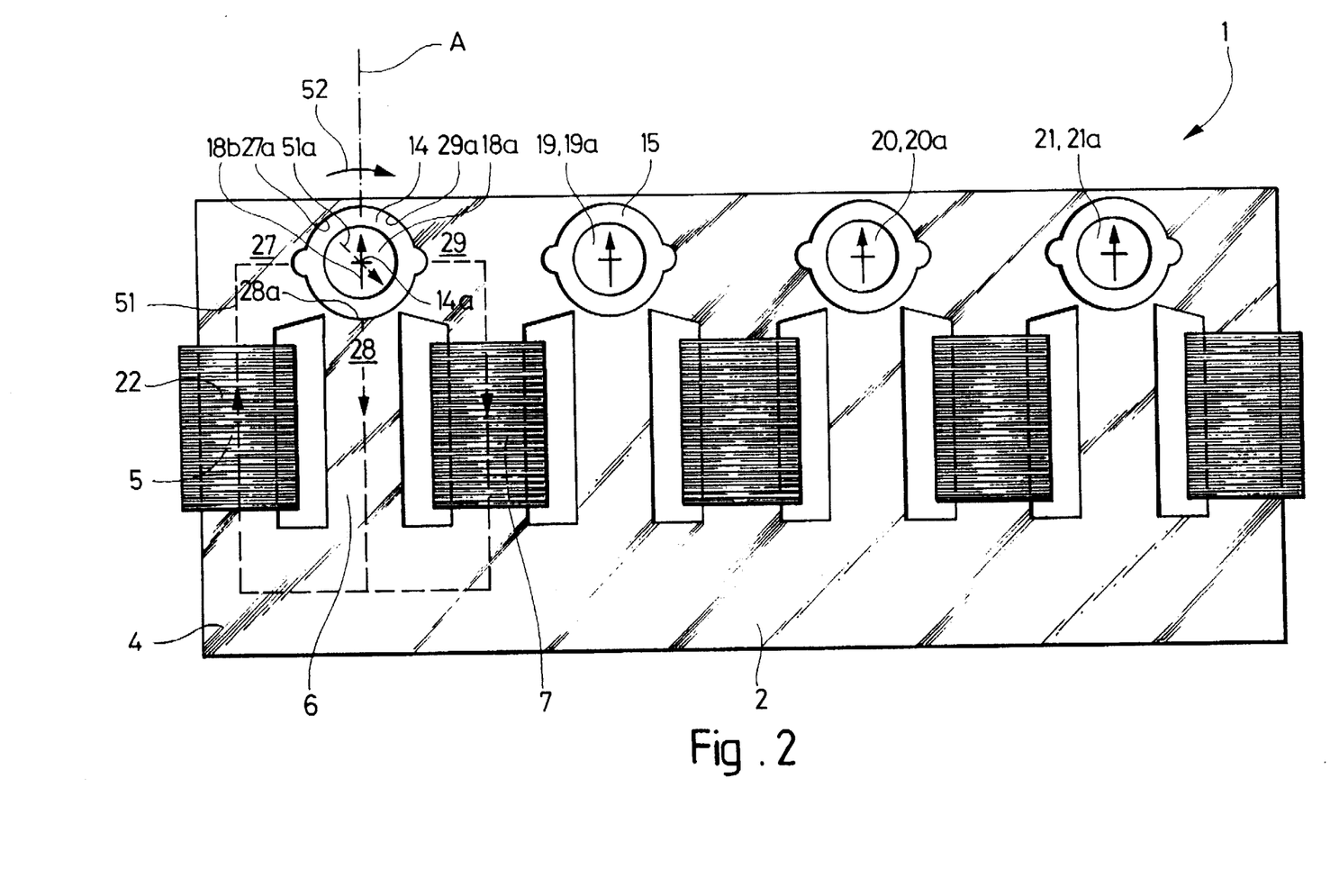
FIGS. 2 to 4 illustrate the operation of the transducer of FIG. 1.

A current flowing in coil 22 induces in transverse part 5 a magnetic field designated by the reference 51, the resultant of which in stator 2 is represented schematically in FIG. 2 by a dotted line.

Magnetic field 51 flows through a closed circuit comprising, in addition to transverse part 5, stator pole 27, opening 14 and thus magnet 18a then, in parallel, stator pole 28 and transverse part 6 on the one hand, and stator pole 29 and transverse part 7 on the other hand, and finally a portion of main part 4.

The resultant of magnetic field 51 in opening 14 and in magnet 18a is designated by the reference 51a. Such resultant 51a of field 51 makes an obtuse angle with plane of symmetry A of opening 14, the value of such angle depending upon that of the angles at the centre on which, polar expansions 27a and 29a, on the one hand, and polar expansion 28a, on the other hand, extend. In practice, this obtuse angle is between approximately 110° and approximately 160°, its exact value being selected, as in conventional stepping motors, as a function of the features which one desires to give the driving torque provided by rotor 18 when transducer 1 operates in the manner which will be described hereinafter.

It should be noted that the magnetic resistance of opening 15 is considerably higher than that of transverse part 7. It follows therefrom that the magnetic field which passes through this opening 15 in response to a current flowing in coil 22 is so weak as to be negligible.

It will be admitted to begin with that rotor 18 is in its first rest position, as is shown in FIGS. 1 and 2.

If the control circuit of transducer 1 then applies a positive driving pulse to coil 22, magnetic field 51 has the direction indicated by the arrows carried by the dotted line which symbolises said field.

It is seen that, in these conditions, the interaction in opening 14 of field 51 and of the field of magnet 18a subject the latter, and thus rotor 18, to a torque which causes such rotor 18 to rotate in the direction of arrow 52, i.e. in the direction generally termed the negative direction. At the end of this driving pulse, rotor 18 thus reaches its second rest position having rotated by 180°.

It is also seen, without the necessity of describing it in detail, that if the control circuit of transducer 1 then applies another driving pulse to coil 22, having the reverse polarity of the preceding pulse, i.e. a negative driving pulse, rotor 18 again rotates by 180° in the negative direction and is again situated in its first rest position after the end of this negative driving pulse.

Driving pulses of alternate polarity applied to coil 22 thus cause the rotation of rotor 18 in the negative direction by successive steps of 180°.

As has been mentioned hereinbefore, the magnetic field which passes through opening 15 and magnet 19a in response to the control pulses applied to coil 22 is negligible. The driving pulses applied to coil 22 in order to make rotor 18 rotate in the negative direction as has been explained hereinbefore, thus have no effect on rotor 19 and, even less so, on rotors 20 and 21.

In summary, it is seen that driving pulses of alternate polarity applied solely to coil 22 cause the rotation of rotor 18, and only of the latter, in the negative direction.

Figure 3:
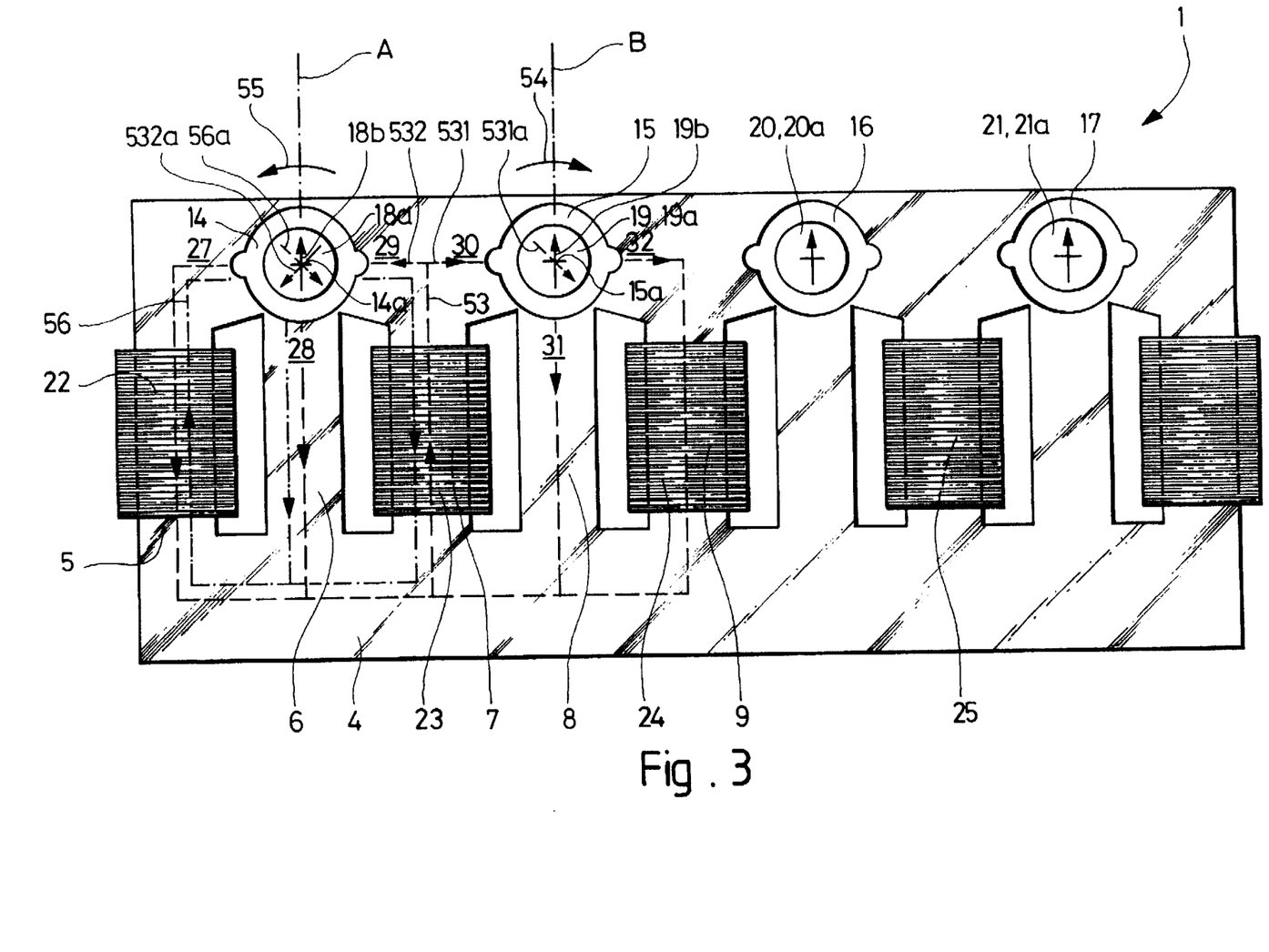

A current flowing in coil 23 induces in transverse part 7 a magnetic field designated by the reference 53, the resultant of which in stator 2 is symbolised in FIG. 3 by a dotted line.

A first part of field 53, designated by the reference 531, passes through a closed circuit comprising, in addition to transverse part 7, stator pole 30, opening 15 and thus magnet 19a then, in parallel, stator pole 31 and transverse part 8 on the one hand, and stator pole 32 and transverse part 9 on the other hand, and finally a portion of main part 4.

The resultant of such first part 531 of field 53 in opening 15, which is designated by the reference 531a, makes, with plane of symmetry B, an obtuse angle the value of which is also, in practice, between approximately 110° and approximately 160°.

A second part of field 53, designated by the reference 532, passes through another closed circuit comprising, in addition to transverse part 7, stator pole 29, opening 14 and thus magnet 18a then, in parallel, stator pole 27 and transverse part 5 on the one hand, and stator pole 28 and transverse part 6 on the other hand, and finally a portion of main part 4.

The resultant of such second part 532 of field 53 in opening 14, which is designated by the reference 532a, makes, with plane of symmetry A, an obtuse angle which is symmetrical, with respect of such plane A, to the obtuse angle made by resultant 51a of field 51 in the case illustrated in FIG. 2.

It should be noted that the magnetic resistances of the circuits through which parts 531 and 532 of field 53 respectively pass, are substantially equal, so that these two parts 531 and 532 are also substantially equal. On the other hand, the magnetic resistance of opening 16 is considerably higher than that of transverse part 9. Consequently, the magnetic field which passes through such opening 9 in response to a current flowing in coil 23 is negligible.

When the control circuit of transducer 1 applies a positive driving pulse to coil 23, magnetic field 53 has the direction indicated by the arrows carried by the dotted line which symbolises such field.

It is seen that, if rotor 19 is in its first rest position at the beginning of such positive driving pulse, the interaction in opening 15 of part 531 of field 53 and of the field of magnet 19a subjects this latter, and thus rotor 19, to a torque which causes rotor 19 to rotate in the direction of arrow 54, i.e. again in the negative direction. At the end of this driving pulse, rotor 19 thus reaches its second rest position after having rotated by 180°.

It is also seen that if the control circuit of transducer 1 then applies a negative driving pulse to coil 23, rotor 19 again rotates in the negative direction and is again situated in its first rest position after the end of this negative driving pulse.

Driving pulses of alternate polarity applied to coil 23 thus cause the rotation of rotor 19 in the negative direction, by successive steps of 180°. Furthermore, these driving pulses applied to coil 23 have no effect on rotor 20, and less so on rotor 21, since the magnetic field which passes through opening 16 in response to a current flowing in such coil 23 is very weak.

As has been seen hereinbefore, the two parts 531 and 532 of field 53 are substantially equal. If the driving pulses applied to coil 23 cause the rotation of rotor 19 as has just been described, it is thus entirely possible, and even probable, that these driving pulses also simultaneously cause a rotation of rotor 18. However, resultant 532a of field 53 in opening 14 is symmetrical with respect to plane A of resultant 51a of field 51 produced by a current flowing in coil 22 (see FIG. 2). The torque to which rotor 18 is subjected in response to the driving pulses applied to coil 23 thus has the opposite direction to that which it has when driving pulses are applied to coil 22. The driving pulses applied to coil 23 thus cause a rotation of rotor 18 in the positive direction indicated in FIG. 3 by arrow 55.

As has been seen hereinbefore, a magnetic field is induced in transverse part 5 of stator 2 by a current flowing in coil 22. This field is symbolised in FIG. 3 by a dot and dash line, and it is designated in this case by the reference 56.

The circuit through which field 56 passes is obviously identical to that through which field 51 passes in the case of FIG. 2 and it will thus not be described again here. It will simply be mentioned that the resultant of this field 56 in opening 14 and in magnet 18a is designated by the reference 56a.

This resultant 56 obviously has the same direction as resultant 51a of field 51 of FIG. 2, and this direction is thus symmetrical, with respect to plane A, to that of resultant 532a of field 53.

If a driving pulse, for example a positive pulse, is applied to coil 23 in order to make rotor 19 rotate in the manner described hereinbefore, and if a control pulse, also positive, is simultaneously applied to coil 22, respective resultants 532a and 56a of fields 53 and 56 in opening 14 have symmetrical directions to each other with respect to plane A. Furthermore, such resultants 532a and 56a have opposite directions with respect to a perpendicular direction to such plane A. As a result if, also, the two fields 532 and 56 have equal absolute values, the torques which result respectively from the interaction in opening 14 of the field of magnet 18a with these fields 532 and 56 are equal in absolute value and of opposite directions. These two torques thus cancel each other out, and rotor 18 remains immobile whatever position it occupies.

The control pulse applied in this case to coil 22 is thus a compensation pulse which compensates the effect on rotor 18 of the driving pulse applied to coil 23 in order to cause rotor 19 to rotate.

It is obvious that when the control circuit of transducer 1 applies a negative driving pulse to make rotor 19 rotate from its second to its first rest position, this control circuit must simultaneously apply a negative compensation pulse to coil 22 in order to prevent any rotation of rotor 18.

In summary, in order to make rotor 19 rotate in the negative direction, the control circuit of transducer 1 applies driving pulses of alternate polarity to coil 23. If it is also desired that such rotor 19 should be the only one to rotate in response to these driving pulses, the control circuit of transducer 1 applies to coil 22 compensation pulses having the same polarity as these driving pulses, in synchronism with these latter. In other words, the compensation pulses applied to coil 22 are in phase with the driving pulses applied to coil 23.

In the light of the explanations given hereinbefore, the man skilled in the art will easily see, without the necessity of describing it in detail, that in order to make rotor 20 rotate in the negative direction, the control circuit of transducer 1 applies driving pulses of alternate polarity to coil 24. These driving pulses have no effect on rotor 21. On the other hand, these driving pulses act on rotor 19 and tend to cause it to rotate in the positive direction. In order to avoid this effect, the control circuit of transducer 1 must apply compensation pulses in phase with these driving pulses to coil 23.

However, these compensation pulses applied to coil 23 also act on rotor 18 and tend to cause it too to rotate in the positive direction. In order to avoid this latter effect, the control circuit of transducer 1 must apply to coil 22 other compensation pulses in phase with those which are applied to coil 23, and thus also in phase with the driving pulses applied to coil 24.

The man skilled in the art will also see that in order to make rotor 21 rotate in the negative direction, the control circuit of transducer 1 applies driving pulses of alternate polarity to coil 25. Moreover, if rotor 21 must be the only one to rotate, the control circuit of transducer 1 applies compensation pulses in phase with these driving pulses to coils 22, 23 and 24.

Figure 4:
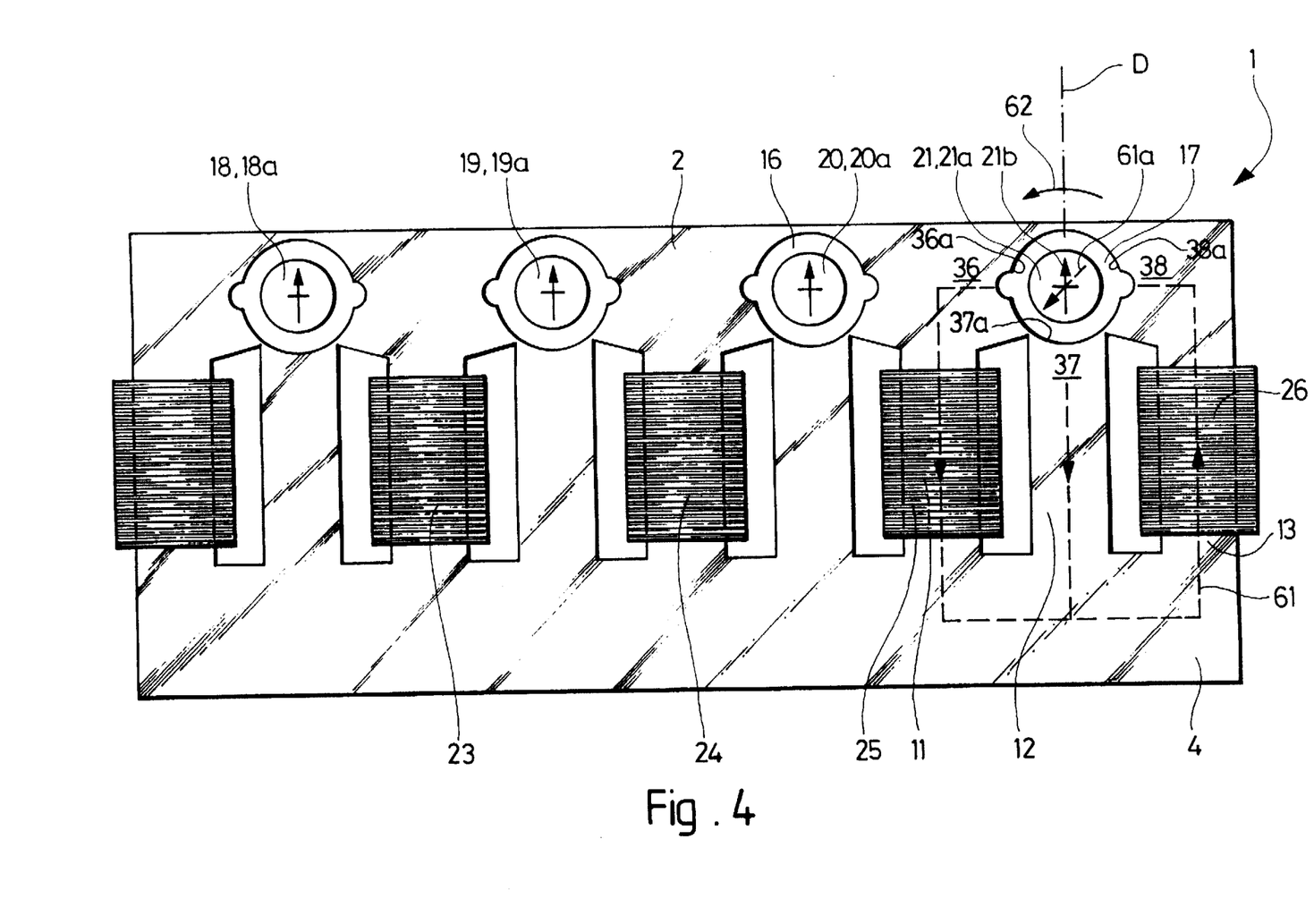

A current flowing in coil 26 induces in transverse part 13 a magnetic field, designated by the reference 61, the resultant of which is represented schematically in FIG. 4 by a dotted line.

Magnetic field 61 passes through a closed circuit comprising, in addition to transverse part 13, stator pole 38, opening 17 and thus magnet 21a then, in parallel, stator pole 37 and transverse part 12 on the one hand, and stator pole 36 and transverse part 11 on the other hand, and finally a portion of main part 4.

The resultant of field 61 in opening 17 and in magnet 21a is designated by the reference 61a. This resultant 61a of field 61 makes, with plane of symmetry D, an obtuse angle whose value depends upon that of the angles at the centre on which polar expansions 36a and 38a on the one hand, and 37a on the other hand, extend.

It should be noted that the direction of this resultant 61a is symmetrical with respect to plane D of the direction of the resultant in opening 17, which is not shown in FIG. 4, of the field which would be induced in stator 2 bye current flowing in coil 25.

It should also be noted that the magnetic resistance of opening 16 is considerably higher than that of transverse part 11. It follows that the magnetic field which passes through this opening 16 in response to a current passing in coil 26 is negligible.

When the control circuit of transducer 1 applies a positive driving pulse to coil 26, magnetic field 61 has the direction indicated by the arrows carried by the dotted line which symbolises said field.

It is seen that if rotor 21 is then in its first rest position, the interaction in opening 17 of field 61 and of the field of magnet 21a subjects this latter, and thus rotor 21, to a torque which causes this rotor 21 to rotate in the direction of arrow 62, i.e. the positive direction.

At the end of this driving pulse, rotor 21 thus reaches its second rest position after having rotated by 180° in the positive direction.

It is also seen that if the control circuit of transducer 1 then applies to coil 26 a negative driving pulse, rotor 21 again rotates through 180° in the positive direction and is again situated in its first rest position after the end of this driving pulse.

Driving pulses of alternate polarity applied to coil 26 thus cause the rotation of rotor 21 in the positive direction by successive steps of 180°.

Moreover, these driving pulses applied to coil 26 have no effect on rotor 20, nor less so, on rotors 18 and 19.

The manner of controlling transducer 1 so that rotors 18 to 20 rotate in the positive direction will not be described in detail here since it can be easily deduced from the explanations given hereinbefore as to how to make these rotors rotate in the negative direction and as to how to make rotor 21 rotate in the positive direction.

It will simply be mentioned that, in order to make rotor 20 rotate in the positive direction, the control circuit of transducer 1 applies driving pulses of alternate polarity to coil 25. If such rotor 20 must be the only one to rotate, the control circuit applies to coil 26 compensation pulses in phase with the driving pulses applied to coil 25.

Likewise, in order to make rotor 19 rotate in the positive direction, the control circuit applies to coil 24 driving pulses of alternate polarity and, if this rotor 19 must be the only one to rotate, the control circuit applies to coils 25 and 26 compensation pulses in phase with these driving pulses.

Finally, in order to make rotor 18 rotate in the positive direction, the control circuit applies to coil 23 driving pulses of alternate polarity and, if this rotor 18 must be the only one to rotate, the control circuit applies to coils 24, 25 and 26 compensation pulses in phase with these driving pulses.

It will be noted that the man skilled in the art, on the basis of the preceding teaching, is in a position to conceive various commands of the transducer according to the invention allowing two or more rotors to rotate simultaneously in a determined direction.

Figure 5:
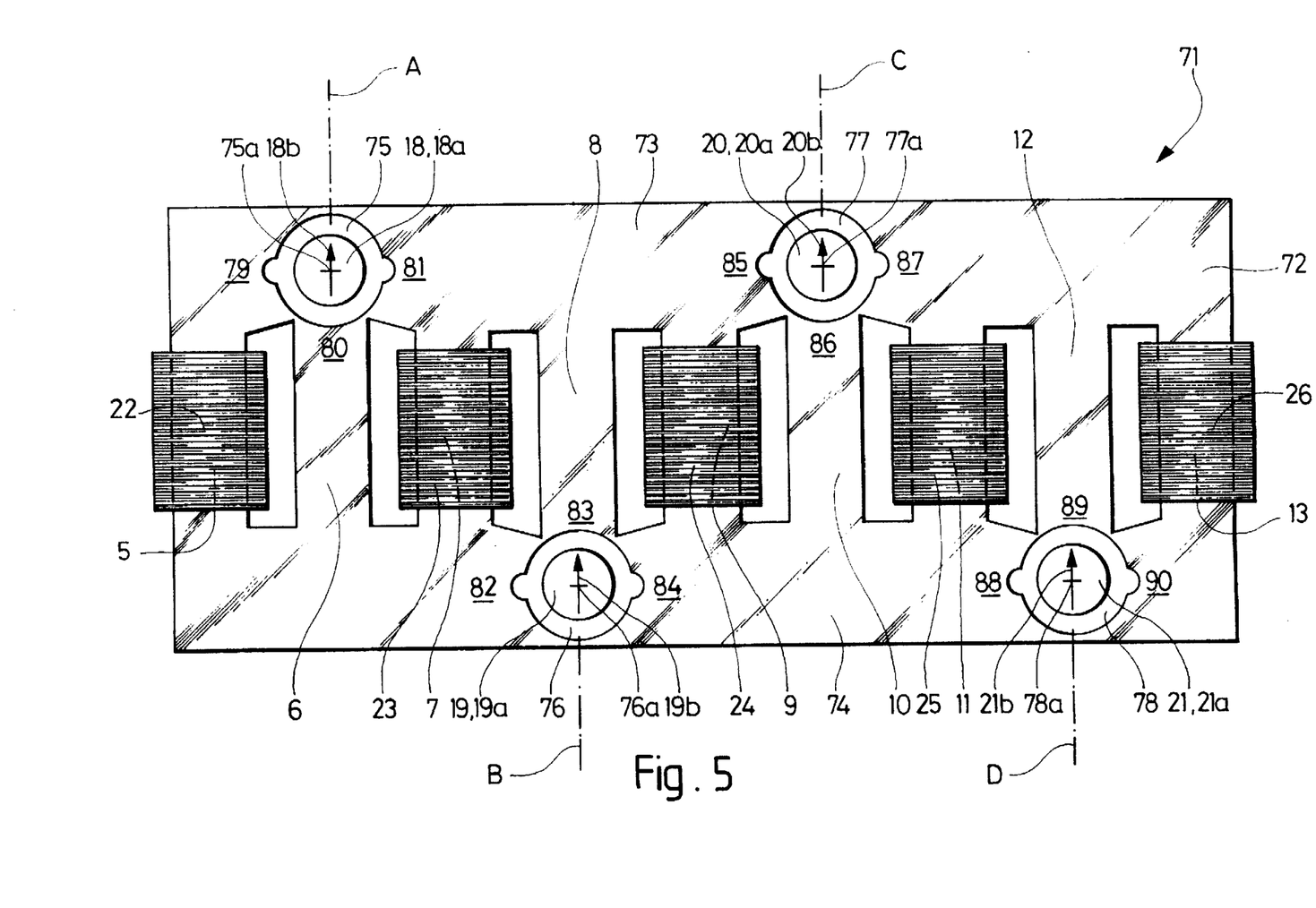
FIGS. 5 and 6 show two other embodiments of the transducer according to the invention.

In the embodiment shown in FIG. 5, the electromechanical transducer according to the present invention, designated by the reference 71, comprises, like transducer 1 of FIG. 1, a stator, designated by the reference 72, four rotors and five coils.

Stator 72 also comprises two main parts, designated by the references 73 and 74, and nine transverse parts. These transverse parts are similar to transverse parts 5 to 13 of stator 2 of FIG. 1 and are designated by the same references.

Moreover, main parts 73 and 74 on the one hand, and transverse parts 5 to 13 on the other hand are arranged and connected to each other in the same manner as the corresponding parts of stator 2 of FIG. 1.

Stator 72 is also pierced with four openings, designated by the references 75 to 78, which all have the general shape of a circular cylinder. The axes of these cylinders are designated by the references 75a to 78a.

Only the two openings 75 and 77 are arranged in first main part 73, the two other openings 76 and 78 being arranged in second main part 74.

However, as in the case of FIG. 1, the four openings 75 to 78 are respectively arranged in the prolongation of even rank transverse parts 6, 8, 10 and 12.

Transducer 71 also comprises four rotors each passing through one of openings 75 to 78 and which are free to rotate about axes 75a to 78a of these latter. These rotors are similar to rotors 18 to 21 of transducer 1 of FIG. 1 and are designated by the same references as these latter.

Moreover, as in FIG. 1, only permanent magnets 18a to 21a of such rotor 18 to 21 are visible in FIG. 5, wherein the resultants of the fields which they produce have also been symbolised by arrows in full lines designated respectively by the references 18b to 21b. Transducer 71 also comprises five coils similar to coils 22 to 26 of transducer 1, designated by the same references as these latter and also each surrounding one of odd rank transverse parts 5, 7, 9, 11 and 13.

It is obvious that, as in stator 2 of FIG. 1, these odd rank transverse parts, which constitute the cores of coils 22 to 26, are also, preferably, parts added onto the rest of stator 72, whereas even rank transverse parts 6, 8, 10 and 12 preferably are integral with main parts 73 and 74.

As in the case of transducer 1 of FIG. 1, each of openings 75 to 78 is surrounded by three stator poles designated respectively by the references 79 to 81, 82 to 84, 85 to 87, and 88 to 90. Stator poles 79, 81, 85 and 87 are formed by portions of main part 73, stator poles 82, 84, 88 and 90 by portions of main part 74, and stator poles 80, 83, 86 and 89 by portions of even rank transverse parts 6, 8, 10 and 12 respectively.

Transducer 71 will not be described in more detail since its structure is entirely similar to that of transducer 1 of FIG. 1, with the exception of course of the particular elements mentioned hereinbefore.

It will simply be noted that transducer 71 also comprises means for positioning rotors 18 to 21, and that these means are also arranged in such a way that magnetisation axes 18b to 21b of magnets 18a to 21a are respectively situated in planes of symmetry A to D of openings 75 to 78.

The operation of transducer 71 will not be described in detail either since it can easily be deduced from the operation, described hereinbefore, of transducer 1 of FIG. 1.

It will simply be noted that, as in the case of transducer 1 of FIG. 1, driving pulses applied to coils 22, 23, 24 or 25 of transducer 71 respectively cause the rotation of rotors 18, 19, 20 and 21 in a first direction, and that driving pulses applied to coils 23, 24, 25 or 26 of such transducer 71 respectively cause the rotation of rotors 18, 19, 20 and 21 in a second direction. These first and second directions of rotors 18 and 20 are respectively the negative direction and the positive direction, as in the case of transducer 1. On the other hand, for rotors 19 and 21, these first and second directions are respectively the positive direction and the negative direction, i.e. the reverse of what occurs in the case of transducer 1 of FIG. 1.

It is also obvious that compensation pulses must be applied to certain coils, in the same way as in the case of transducer 1 of FIG. 1, in order to avoid driving pulses intended to cause one rotor to rotate also making another rotor rotate.

The man skilled in the art will easily see that, in alternative embodiments of transducer 71, the openings arranged in the stator may be distributed in a different manner to that which has been shown in FIG. 5.

Thus, for example, two openings may be arranged in one of the main parts in the prolongation of the two first even rank transverse parts 6 and 8, the two other openings being arranged in the other main part facing the two last even rank transverse parts 10 and 12.

Still byway of example, two openings may be arranged in one of the main parts in the prolongation of the first and the last even rank transverse parts 6 and 12, the two other openings being then arranged in the other main part in the prolongation of second and third transverse parts 8 and 10.

Likewise, three openings may be arranged in one of the main parts and the fourth opening in the other main part.

Figure 6:
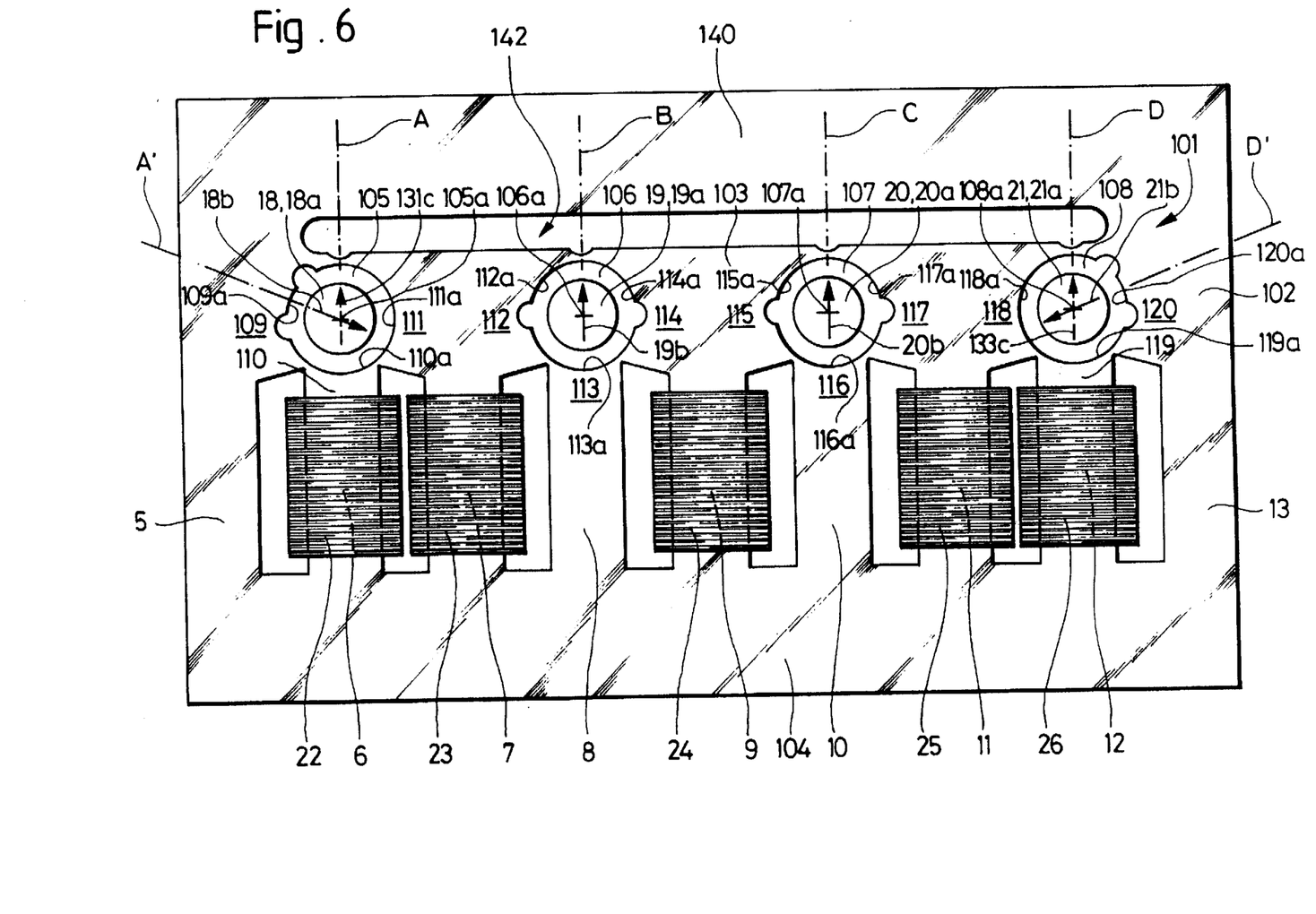

In the embodiment shown schematically in FIG. 6, the electromechanical transducer of the present invention, designated by the reference 101, also comprises a stator, designated by the reference 102, four rotors and five coils.

Stator 102 also comprises two main parts 103 and 104 and nine transverse parts similar to transverse parts 5 to 13 of transducer 1 of FIG. 1 and designated by the same references. Main parts 103 and 104 on the one hand and such transverse parts 5 to 13 on the other hand, are arranged and connected to each other in the same manner as the corresponding parts of stator 2 of FIG. 1.

Stator 2 is also pierced with four openings, designated by the references 105 to 108, all having the general shape of circular cylinders whose axes are respectively designated by the references 105a to 108a. These four openings 105 to 108 are all arranged in main part 103, each in the prolongation of one of even rank transverse parts 6, 8, 10 and 12.

The four rotors of transducer 1 are similar to rotors 18 to 21 of transducer 1 of FIG. 1 and are designated by the same references as these latter. Each of these rotors 18 to 21 passes through one of openings 105 to 108 in which it is immobile in rotation about respective axis 105a to 108b.

As in FIG. 1, only permanent magnets 18a to 21a of such rotor 18 to 21 are visible in FIG. 6. The resultants of the fields produced by each of these magnets are also symbolised by arrows in full lines respectively designated by the references 18b to 21b.

The five coils of transducer 1 are similar to coils 22 to 26 of transducer 1 and are designated by the same references as these latter.

Again as in transducer 1, coils 23, 24 and 25 of transducer 101 each surround one of odd rank transverse parts 7, 9 and 11 respectively. On the other hand, coils 22 and 26 surround respectively even rank transverse parts 6 and 12.

In this case, transverse parts 6, 7, 9, 11 and 12 which constitute respectively the cores of coils 22 to 26, are obviously preferably pieces added onto the rest of stator 102, whereas the other transverse parts 5, 8, 10 and 13 preferably are integral with main parts 103 and 104.

Stator poles 109 to 120 which surround in threes openings 105 to 108 and polar expansions 109a to 120a situated at their respective ends will not be described in detail here since their makeup and arrangement are entirely similar to those of stator poles 27 to 38 and polar expansions 27a to 38a of stator 2 of FIG. 1. In particular, as in stator 2 of FIG. 1, the three stator poles which each surround openings 105 to 108 are also separated in pairs by necks having very high magnetic resistance. Stator 102 of the embodiment described in FIG. 6 is distinguished from the stator of FIG. 1 in particular in that the two stator poles 109 and 120 are magnetically coupled via a third main part 140, which defines an opening 142 between first main part 103 and this third main part 140. Thus stator 102 may be extended in all directions to be used in particular for the mounting of various elements of a device for which the transducer according to the invention is intended.

Moreover, the two main polar expansions which partially surround each of openings 105 to 108 are symmetrical to each other with respect to a plane containing axis 105a to 108a of this opening and passing through the middle of the transverse polar expansion which also partially surrounds this same opening and which is itself symmetrical with respect to this plane. These four planes of symmetry are designated by the references A to D and their traces in the plane of FIG. 6 are partially indicated by dot and dash lines.

Transducer 101 also comprises means for positioning rotors 18 to 21. The two notches which constitute the positioning means of each of rotors 19 and 21 are symmetrical to each other with respect to plane of symmetry B and, respectively, C as in transducer 1 of FIG. 1. Magnetisation axes 19b and 20b of magnets 19a and 20a of these rotors 19 and 20 are thus respectively situated in planes B and C when such rotors 19 and 20 are in one or other of their rest positions. By analogy with the case illustrated in FIG. 1, the position of such rotors 19 and 20 in which magnetisation axes 19b and 20b are directed towards the neck diametrically opposite to transverse polar expansion 113a and, respectively, 116a will arbitrarily be called the first rest position. The second rest position of rotors 19 and 20 is obviously that in which magnetisation axes 19b and 20b are respectively directed towards the middle of these polar expansions 113a and 116a.

The notches which constitute in this example the means for positioning rotor 18, on the other hand, are symmetrical to each other with respect to a plane which contains axis 105a of opening 105 and which passes through the middle of polar expansion 109a. This plane is designated by the reference A' and its trace in the plane of FIG. 6 is partially indicated by a dot and dash line. When rotor 18 is in one or other of its two rest positions, magnetisation axis 18b of its magnet 18a is thus situated in this plane A'.

The position of rotor 18 in which magnetisation axis 18b is directed towards the point diametrically opposite to the middle of polar expansion 109a as is shown in FIG. 6, will arbitrarily be called the first rest position. Likewise, the position in which such magnetisation axis 18b is directed towards the middle of such polar expansion 109a will be called the second rest position.

In a similar manner, the notches which constitute, in this example, the positioning means of rotor 21 are symmetrical to each other with respect to a plane which contains axis 108a of opening 108 and which passes through the middle of polar expansion 120a. This plane is designated by the reference D', and its trace in the plane of FIG. 6 is partially indicated by a dot and dash line. When rotor 21 is in one or other of its two rest positions, magnetisation axis 21b of its magnet 21 is thus situated in this plane D'.

The position of rotor 21 in which magnetisation axis 21b is directed towards the point diametrically opposite to the middle of polar expansion 120a, as is shown in FIG. 6, will arbitrarily be called the first rest position. Likewise, the position in which such magnetisation axis 21b is directed towards the middle of polar expansion 120a will be called the second rest position of rotor 21.

Figure 7:
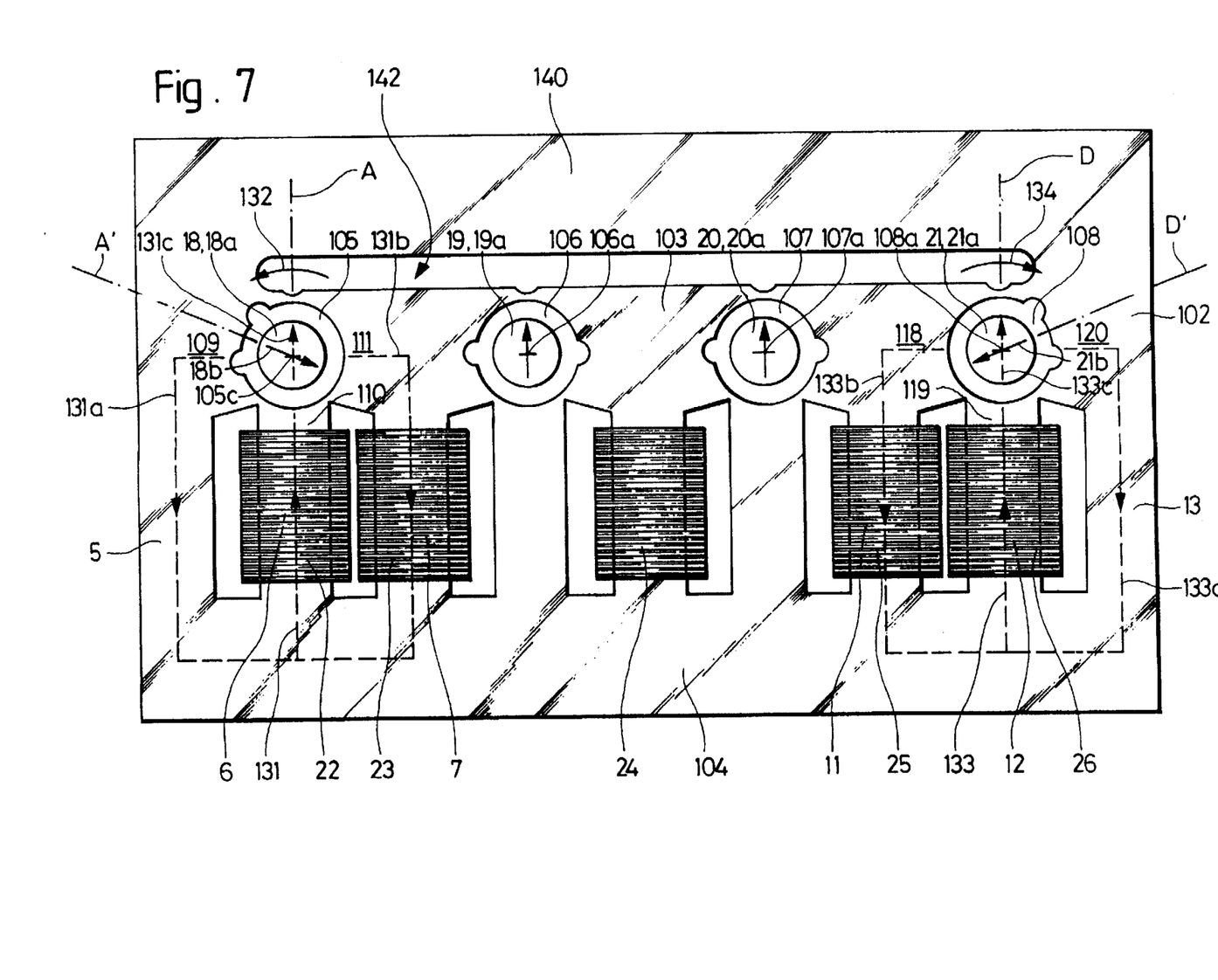
FIG. 7 illustrates the operation of the transducer of FIG. 6.

A current flowing in coil 22 of transducer 101 induces in transverse part 6 a magnetic field 131 the resultant of which is represented schematically in FIG. 7 by a dotted line.

Field 131 passes through stator pole 110 and penetrates opening 105 where it separates into two parts 131a and 131b. Part 131a of field 131 comes out of opening 105 via stator pole 109 and rejoins transverse part 6 by passing through transverse part 5 and through a portion of main part 104. Part 131b of field 131 comes out of opening 105 via stator pole 11 and rejoins transverse part 6 by passing through transverse part 7 and through a portion of main part 104.

The resultant of this field 131 in opening 105 and in magnet 18a, which is designated by the reference 131c, is situated in plane of symmetry A of opening 105.

When the control circuit of transducer 101 applies a positive driving pulse to coil 22, field 131 has the direction indicated by the arrows carried by the dotted line which symbolises said field.

If rotor 18 is in its first rest position, it is then subjected to a torque which causes it to rotate in the direction of arrow 132, i.e. in the positive direction. At the end of this positive driving pulse, rotor 18 thus reaches its second rest position after having rotated through 180° in the positive direction.

If the control circuit of transducer 101 then applies a negative driving pulse to coil 22, rotor 18 again rotates through 180° in the positive direction and is again situated in its first rest position at the end of this driving pulse.

It is thus seen that driving pulses of alternate polarity applied to rotor 22 cause the rotation of rotor 18 in the positive direction through steps of 180°.

For similar reasons to those which have been given in the case illustrated by FIG. 2, the driving pulses applied to coil 22 as has just been described have no influence on rotor 19, nor of course, on rotors 20 and 21.

The magnetic field induced in transverse part 7 by a current flowing in coil 23 follows exactly the same circuit as field 53 described in the case illustrated by FIG. 3. This circuit will thus not be described again here.

As in the case illustrated by FIG. 3, driving pulses of alternate polarity applied to coil 23 of transducer 101 cause rotor 19 to rotate in the negative direction.

However, the resultant in opening 105 of the field induced in transverse part 7 in response to these driving pulses also makes an obtuse angle with plane A' in which magnetisation axis 18b of magnet 18a is situated when rotor 18 is in one or other of its two rest positions. Rotor 18 may thus also rotate in the negative direction in response to these driving pulses applied to coil 23.

If one wishes rotor 19 to be the only one to rotate in response to these driving pulses, the control circuit of transducer 101 must therefore also apply compensation pulses in phase with these driving pulses to coil 23, as in the case illustrated by FIG. 3.

It can be easily seen, by analogy with what has been described hereinbefore, that if the control circuit of transducer 101 applies driving pulses of alternate polarity to coil 24, rotor 20 rotates in the negative direction. Moreover, if such rotor 20 must be the only one to rotate, the control circuit of transducer 101 must apply to coils 22 and 23 compensation pulses in phase with these driving pulses applied to coil 24.

It is also seen that if the control circuit of transducer 101 applies driving pulses of alternate polarity to coil 25, rotor 21 rotates in the positive direction and that, if such rotor 21 must be the only one to rotate, the control circuit of transducer 101 must apply to coils 22, 23 and 24 compensation pulses in phase with these driving pulses applied to coil 25.

A current flowing in coil 26 of transducer 101 induces in transverse part 12 a magnetic field 133 the resultant of which is also schematically represented in FIG. 7 by a dotted line.

Field 133 passes through stator pole 119 and penetrates opening 108 where it separates into two parts 133a and 133b. Part 133a of field 133 comes out of opening 108 via stator pole 120 and rejoins transverse part 12 by passing through transverse part 13 and through a portion of main part 104. Part 133b of field 133 comes out of opening 108 via stator pole 118 and rejoins transverse part 12 by passing through transverse part 11 and through a portion of transverse part 104.

The resultant of field 133 in opening 108 and in magnet 21a, which is designated by the reference 133c, is situated in plane of symmetry D of opening 108.

When the control circuit of transducer 101 applies a positive driving pulse to coil 26, field 133 has the direction indicated by the arrows carried by the dotted line which symbolises said field.

If rotor 21 is then in its first rest position, it is subjected to a torque which causes it to rotate in the direction of arrow 134, i.e. in the negative direction. At the end of this driving pulse, rotor 21 thus reaches its second rest position after having rotated through 180° in the negative direction.

If the control circuit of transducer 101 then applies a negative driving pulse to coil 26, rotor 21 again rotates through 180° in the negative direction and is thus again situated in its first rest position at the end of this driving pulse.

It is thus seen that driving pulses of alternate polarity applied to coil 26 cause the rotation of rotor 21 in the negative direction by steps of 180°.

For similar reasons to those which have been given in the case illustrated by FIG. 2, the driving pulses applied to coil 26 as has just been described, have no influence on rotor 20 nor on rotors 18 and 19.

The manner of controlling transducer 101 so that rotors 19 and 20 rotate in the positive direction and so that rotor 18 rotates in the negative direction will not be described in detail here since it can easily be deduced from the explanations given hereinbefore.

It should be noted that, in an alternative embodiment of transducer 101, only one of coils 22 and 26 is arranged on the respective even rank transverse part 6 or 12, the other of these two coils 22 and 26 being then arranged on respective odd rank transverse part 5 or 13, as it is in the examples of FIGS. 1 and 5.

Moreover, one or more of openings 105 to 108 may also be arranged in second main part 104 of stator 102.

In such case, the direction of rotation of each rotor situated in one of such openings arranged in second main part 104 is the reverse of that which it is in the example described hereinbefore.

Numerous modifications may be made to the electromechanical transducer, various embodiments of which have been described hereinbefore, without thereby departing from the scope of the present invention.

In particular, the stator of a transducer according to the present invention may comprise a number of openings other than four, such number being able to be any number equal to or greater than two.

In an entirely general manner, if the number of openings arranged in one or other of the two main parts of the stator of such a transducer is designated by "N", such number N being then of course also the number of rotors of such transducer, this latter then comprises (N+1) coils and its stator comprises (2N+1) transverse parts of which N are of even rank and (N+1) are of odd rank. Each of the N openings is arranged in the prolongation of one of the N even rank transverse parts.

As has been done hereinbefore for the transverse parts, a rank can be assigned to each of the N openings arranged in the stator of the transducer, and thus to the N rotors passing through these openings.

Thus, rank one will be assigned to the opening closest to the first end of the transducer. This opening is that which is arranged in the prolongation of the transverse part having the lowest even rank, i.e. rank two. Rank one is of course assigned also to the rotor passing through such rank one opening. Rank two will thus be assigned to the opening arranged in the prolongation of the transverse part of rank four, i.e. the second even rank transverse part, and so on, if necessary, until rank N which will be assigned to the opening closest to the second end of the stator, i.e. that which is arranged in the prolongation of the Nth even rank transverse part. Ranks two to N will obviously also be respectively assigned to the rotors passing through these openings of ranks two to N.

In all the examples described hereinbefore with the aid of FIGS. 1, 5 and 6, rotors 18 to 21 are thus respectively the rotors of ranks one to four.

A rank may also be assigned in the same way to each of the (N+1) coils of the transducer. Rank one is thus assigned to the coil situated closest to the first end of the stator of such transducer, rank two to the next coil and so on, until the coil situated closest to the second end of the stator, to which rank (N+1) is assigned.

In all of the examples described hereinbefore, coils 22 to 26 thus have respectively ranks one to five.

It should also be noted that, in all of the embodiments of the transducer according to the present invention, each rotor is surrounded by three polar expansions situated respectively at the end of three stator poles. Two of these stator poles are directly connected to a transverse part constituting the core of a coil, and the third stator pole is directly connected to a transverse part which does not carry a coil.

Moreover, the rotor positioning means are always arranged in such a way that the rotors have two rest positions and that, in each of these two rest positions, the direction of the magnetisation axis of their magnet passes through the middle of the polar expansion situated at the end of the third stator pole which has just been mentioned.

The method for controlling a transducer according to the present invention such as it has been defined hereinbefore may thus be summarised in the following manner:

In order to make a rotor of rank $i$ rotate in its first direction, with $1 \leq i \leq N$, the control circuit of the transducer applies driving pulses of alternate polarity to the coil having the same rank $i$. If $i>1$ and if this rotor of rank $i$ must be the only one to rotate, the control circuit also applies to each coil of rank lower than $i$ compensation pulses in phase with the driving pulses applied to the coil of rank $i$.

In order to make the rotor of rank i rotate in its second direction, the control circuit of the transducer applies driving pulses of alternate polarity to the coil of rank (i+1). If i<N and if this rotor of rank i must be the only one to rotate, the control circuit also applies to each coil of rank higher than (i+1) compensation pulses in phase with the driving pulses applied to the coil of rank (i+1).

It should be noted that the first direction of rotation of a rotor may be the negative direction or the positive direction according to the arrangement of the various transducer elements, the position of the rotor in such transducer, and the end of the stator which is selected as the first end in the assignment of a rank to this rotor.

In other words, the first direction of rotation of a rotor may be, for example, the positive direction, whereas the first direction of rotation of another rotor of the same transducer is the negative direction.

Amongst all the modifications which may also be made to the transducers described hereinbefore, one will also mention that which consists of giving its stator a different general shape to that which has been shown in FIGS. 1 to 7. It is easily seen that this general shape may be any shape, and also that the various parts of this stator may be situated in different planes which may or may not be parallel to each other.

One will also mention the modification which consists of assuring that the angles at the centre, on which extend the two main polar expansions partially surrounding one or other of the openings arranged in the stator of a transducer according to the present invention, are not equal as is the case in the examples hereinbefore.

What is claimed is:

1. An electromechanical transducer comprising:

a stator wherein are arranged N substantially cylindrical openings each defining a central axis, N being any number equal to or greater than two;

a plurality of coils; and

N rotors each passing through one of the openings, each rotor having an identical axis of rotation to the central axis of the opening through which it passes, and comprising a bipolar permanent magnet situated in such opening and having a magnetisation axis perpendicular to such axis of rotation;

wherein:

the stator comprises two main parts each having two ends and 2N+1 transverse parts each having two ends magnetically coupled respectively to one and the other main parts, the 2N+1 transverse parts each having a determined rank within the transducer going from one to 2N 1;

each of the N openings is arranged in one of the main parts in the prolongation of one of the even rank transverse parts and is surrounded by three stator poles each ending in a pole piece, two of such stator poles being formed by portions of such main part and the third of such stator poles/being formed by a portion of said respective even rank transverse part, the N openings each having a rank going from one to N, rank one being assigned to the opening arranged in the prolongation of the transverse part of rank two, rank two being assigned to the opening arranged in the prolongation of the transverse part of rank four, and so on until the opening arranged in the prolongation of the transverse part of rank 2N to which rank N is assigned, and each of the N rotors having a rank equal to that of the opening through which it passes;

the plurality of coils comprises N+1 coils each surrounding a different transverse part and each having a rank going from one to N+1, the coil of rank one surrounding one of the transverse parts of rank one or rank two, the coil of rank N+1 surrounding one of the transverse parts of rank 2N or 2N+1, and the other coils each surrounding one of the other odd rank transverse parts.

2. An electromechanical transducer according to claim 1, wherein the N openings are all arranged in the same main part.

3. An electromechanical transducer according to claim 1, wherein at least one of the openings is arranged in one of the main parts and the other openings are arranged in the other main part.

4. An electromechanical transducer according to claim 1, wherein the coil of rank one surrounds the transverse part of rank one.

5. An electromechanical transducer according to claim 1, wherein the coil of rank one surrounds the transverse part of rank two.

6. An electromechanical transducer according to claim 1, further comprising means for positioning the rotors arranged in such a way that each rotor has two rest positions, the magnetisation axis of the permanent magnet of each rotor, in each of said rest positions, being situated in a plane containing the axis of rotation of the rotor, the magnetisation axis substantially passing through the middle of the pole piece situated at the end of one stator pole of the three stator poles surrounding the opening through which such rotor passes, said one stator pole being directly connected to a transverse part not carrying a coil.

7. An electromechanical transducer according to claim 1, further comprising:

means for applying driving pulses of alternate polarity to the coil of rank i, with 1≦i≦N, in order to cause the rotor of rank i to rotate in a first direction of rotation, and concomitantly applying compensation pulses in phase with these driving pulses to each coil of lower rank than i, if i is greater than 1; and, means for applying driving pulses of alternate polarity to the coil of rank i+1 in order to cause such rotor of rank i to rotate in a second direction of rotation, and concomitantly applying compensation pulses in phase with these driving pulses to each coil of a higher rank if i+1 is less than N.

8. An electromechanical transducer according to claim 7, wherein, when driving pulses are applied to the coil of rank i in order to cause the rotor of rank i to rotate in its first direction, compensation pulses in phase with said driving pulses are applied to each coil of lower rank than i if i is higher than one, and, when driving pulses are applied to the coil of rank (i+1) in order to cause the rotor of rank i to rotate in its second direction, compensation pulses in phase with said driving pulses are applied to each coil of higher rank than i if i is less than N.

* * * * *